US006260754B1

(12) United States Patent
Bazizi et al.

(10) Patent No.: US 6,260,754 B1
(45) Date of Patent: Jul. 17, 2001

(54) METHOD OF MAKING A VACUUM-TIGHT CONTINUOUS CABLE FEEDTHROUGH DEVICE

(75) Inventors: Kamel Abdel Bazizi, St. Louis, MO (US); Thomas Eugene Haelen, Rochester, NY (US); Frederick Lobkowicz, Penfield, NY (US); Paul Francis Slattery, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 09/431,615

(22) Filed: Nov. 2, 1999

Related U.S. Application Data

(62) Division of application No. 08/958,834, filed on Oct. 28, 1997, now Pat. No. 6,093,886.

(51) Int. Cl.[7] ............................ B23K 31/02; H01B 17/26

(52) U.S. Cl. ........................... 228/178; 228/253; 228/255

(58) Field of Search .................................... 228/178–184, 228/253–255; 174/50.63, 52.2, 52.3, 250, 260, 97, 31 R, 151, 117 F, 11 BH, 12 BH, 14 BH, 18; 333/246

(56) References Cited

U.S. PATENT DOCUMENTS

| | | | |
|---|---|---|---|
| 3,171,519 | * | 3/1965 | Nolte . |
| 3,333,501 | | 8/1967 | Pitcher . |
| 4,186,244 | | 1/1980 | Deffeyes et al. . |
| 4,264,779 | * | 4/1981 | Rhodes et al. . |
| 4,382,236 | | 5/1983 | Suzuki . |
| 4,490,690 | * | 12/1984 | Suzuki . |
| 4,639,693 | | 1/1987 | Suzuki et al. . |
| 4,737,601 | * | 4/1988 | Gartzke . |
| 4,758,688 | * | 7/1988 | Aschberger . |
| 5,195,898 | | 3/1993 | Mary . |
| 5,373,109 | * | 12/1994 | Argyrakis et al. . |
| 5,380,955 | | 1/1995 | Argyrakis et al. . |
| 5,450,765 | * | 9/1995 | Stover . |
| 5,847,324 | * | 12/1998 | Farquhar et al. . |
| 6,055,722 | * | 5/2000 | Tighe et al. . |
| 6,081,728 | * | 6/2000 | Stein et al. . |

OTHER PUBLICATIONS

ASM Handbook: vol. 6 Welding, Brazing, and Soldering. Olson. 1983. p. 1069.*

* cited by examiner

*Primary Examiner*—Tom Dunn
*Assistant Examiner*—Jonathan Johnson
(74) *Attorney, Agent, or Firm*—Nixon Peabody LLP

(57) ABSTRACT

A vacuum-tight cable feedthrough device includes a metallic first flange that is penetrated by a slot. Passing through the slot is a flat stripline cable that includes a plurality of conductive signal channels encompassed by a dielectric material on whose upper and lower surfaces is disposed a conductive material includes a ground. The stripline cable is sealed within the slot to provide a substantially vacuum-tight seal between the cable and the first flange. In a preferred embodiment, the cable feedthrough device includes a plurality, at least 16, of stripline cables. In a further preferred embodiment, the device includes a second flange and a bellows sealably connecting the first and second flanges, thereby providing a substantially vacuum-tight, flexible housing for the plurality of cables.

8 Claims, 5 Drawing Sheets

METHOD OF MAKING A VACUUM-TIGHT CONTINUOUS CABLE FEEDTHROUGH DEVICE

This application is a divisional of U.S. patent application Ser. No. 08/958,834, filed Oct. 28, 1997 for VACUUM-TIGHT CONTINUOUS CABLE FEEDTHROUGH DEVICE, now issued as U.S. Pat. No. 6,093,886.

FIELD OF THE INVENTION

The invention relates to a cable feedthrough device, and more particularly to a substantially vacuum-tight device having stripline cables that pass through and are sealably connected to a metallic flange that can be subsequently mounted on a bulkhead or a vessel wall.

BACKGROUND OF THE INVENTION

In the liquid argon calorimetry system of the ATLAS experiment at the CERN Large Hadron Collider in Geneva, Switzerland, nearly a quarter million signal and calibration lines are required to pass through the walls of the ATLAS calorimeter cryostats. Signal feedthroughs for such applications can be constructed using individual pins sealed in glass or ceramic, but the conductor density required for the ATLAS calorimeter greatly exceeds the densities typically achieved using pin-based feedthrough technology. The two feedthrough planes, one extremely cold, the other relatively warm, would have to be very large to accommodate the required number of lines, resulting in a bulky device. The bulky design would complicate the assembly of the device and the installation of the requisite plumbing services in its vicinity. In addition, the large number of connectors required along the readout path would add to the construction expense and also result in degradation in signal quality.

An alternative to sealed pin technology for the fabrication of cable feedthrough devices entails the use of epoxy materials for the formation of vacuum-tight seals, as described in W. D. Wood and W. L. Wood, “Hermetic Sealing with Epoxy” in Mechanical Engineering, March 1990, Pave Technology Co. This technology, however, is suitable only for devices exposed to temperatures down to about −65° C.

Thus, there continues to be a need for a cable feedthrough device of compact design that is readily and inexpensively fabricated, and is also capable of maintaining vacuum-tightness even at very low temperatures. The device and process of the present invention meet this need.

SUMMARY OF THE INVENTION

In accordance with the present invention, a vacuum-tight cable feedthrough device comprises a metallic first flange that is penetrated by a slot. Passing through the slot is a flat stripline cable that comprises a plurality of conductive signal channels encompassed by a dielectric material on whose upper and lower surface is disposed a conductive material comprising a ground. Solder seals the stripline cable within the slot to provide a substantially vacuum-tight seal between the cable and the first flange.

In a preferred embodiment of the invention, the cable feedthrough device comprises a plurality, at least 16, of stripline cables. In a further preferred embodiment, the device includes a second flange and a bellows sealably connecting the first and second flanges, thereby providing a substantially vacuum-tight, flexible housing for the plurality of cables.

Further in accordance with the invention is a process for making a cable feedthrough device that, in a preferred embodiment, provides for applying a first solder by heating the first flange to a temperature about 20° to 50° C. below the first solder fusing temperature over about 25 minutes to 35 minutes, followed by heating the flange to about 20° to 50° C. above the first solder fusing temperature over about 2 minutes to 6 minutes, and then cooling the flange below the fusing temperature of the first solder.

The continuous cable feedthrough device of the present invention has several substantial advantages over the use of individually sealed pins: it provides desirable compactness; the uninterrupted passage of the cables results in a constant, controlled characteristic impedance along the entire signal path; the absence of pins and their mating connectors significantly lowers cost and simplifies installation; the continuous conductor through the soldered cable-flange interface provides improved electrical reliability.

DETAILED DESCRIPTION OF THE INVENTION

Figure 7:
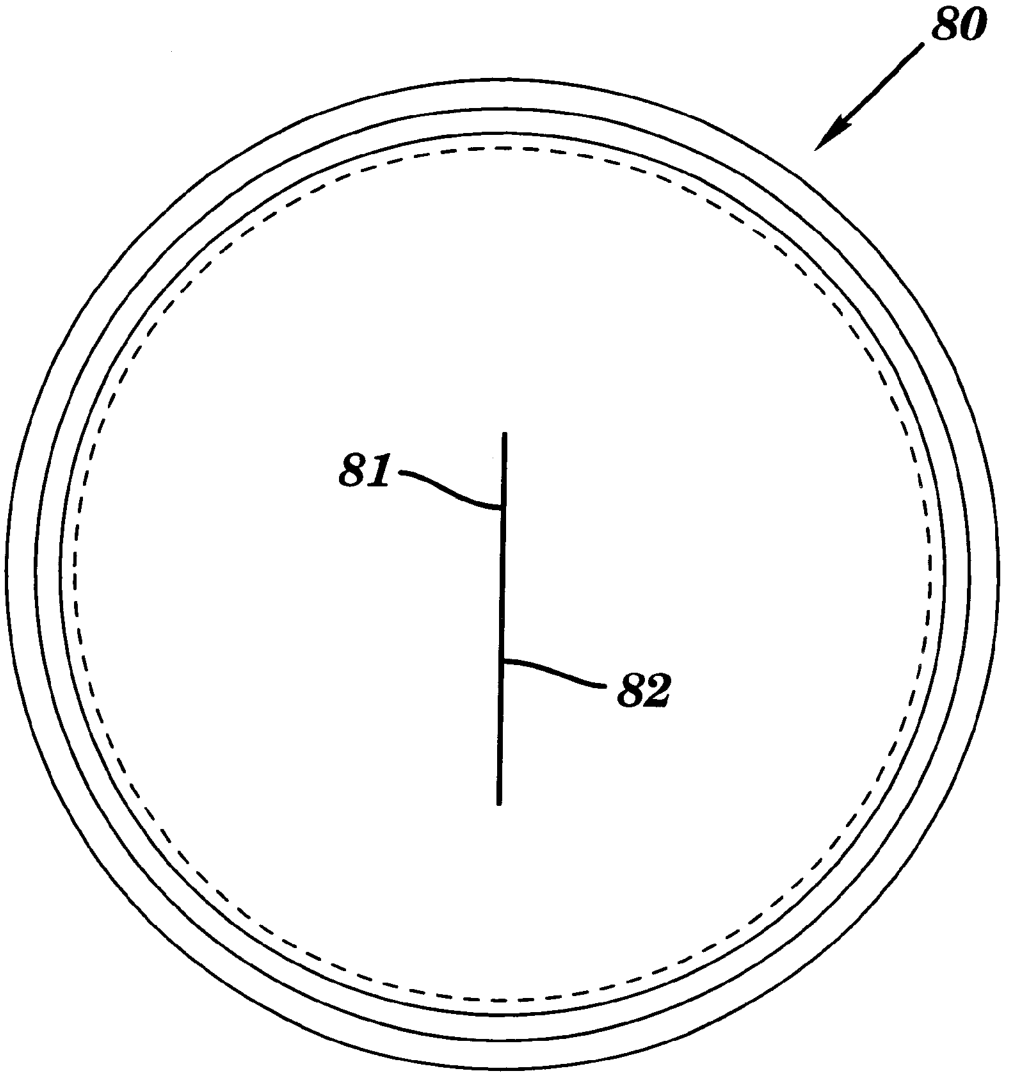
FIG. 7 is a view which is not to scale of a flange with a slot and a stripline cable which contains sixty-four channels located in the slot in accordance with one embodiment of the present invention.

In accordance with the invention, a stripline cable passes through a slot in a metallic flange, to which the cable is sealably connected by solder. The slot is cut through the flange using Electrical Discharge Machining (EDM). In one embodiment as shown in FIG. 7, the flange is 0.375 inch (9.53 mm) thick, the slot 81 dimensions are 1.4 inches× 0.030 inch (35.6 mm×0.76 mm), and the stripline cable 82 contains 64 signal channels. The inner edge surfaces of the slot are preferably pre-plated first with a nickel layer and then with an overlying solder layer, and the assembly is heated above the fusing temperature of a relatively low-melting solder while applying the low-melting solder to sealably bond the cable to the plate. Construction of a vacuum-tight feedthrough device requires a leak-tight cable and a solderable cable and slot, along with a solder of sufficiently low fusing temperature to ensure that the dielectric component of the cable, which is preferably a Kapton™ polyimide resin, is not damaged during the soldering process.

In a preferred embodiment, copper is electrodeposited on a portion of the edge surfaces of the stripline cable that are to be situated within a flange slot and sealably soldered therein. The outer surfaces of the cable where the low melting solder is to be applied are then preferably electroplated with 63/37 tin-lead solder, which provides good corrosion resistance and ease of solderability. As previously noted, the slots in the flange are preferably also electroplated with tin-lead solder, applied on top of a very thin (0.001 inch, 25 μm) underlying layer of nickel.

Among relatively low-melting solders, an indium-tin solder is preferred. A 50/50 indium-tin solder having a fusing temperature of about 250° F. (121° C.) is especially preferred for its excellent properties under cryogenic conditions. Indium-tin solder, furthermore, has good malleability and wettability as well as good resistance to thermal fatigue. To improve the solderability of the surfaces to be soldered, a low temperature activating (180° F. 82° C.), water soluble flux is preferably used to remove the metal oxides immediately before the solder flows, thereby ensuring complete solder wetting.

Figure 1:
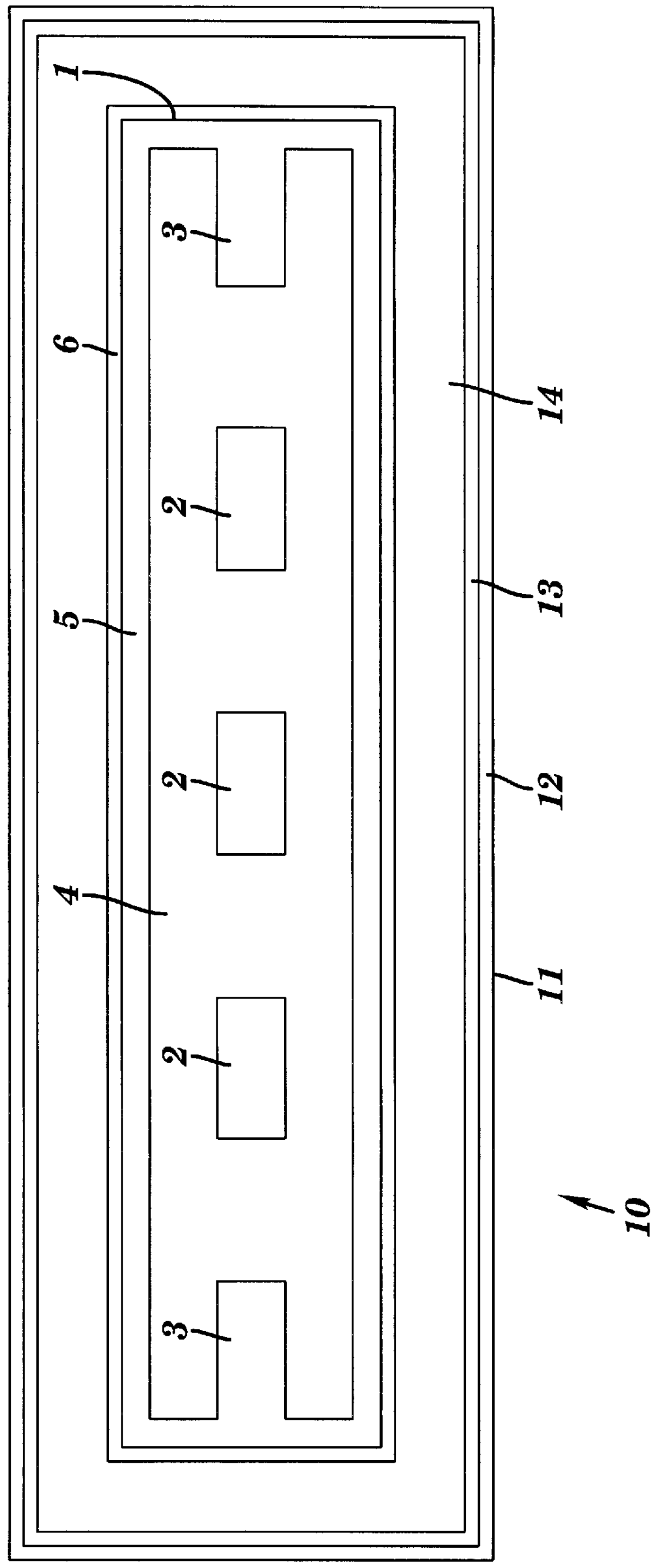
FIG. 1 is a schematic cross-sectional view of a stripline cable inserted in a slot.

FIG. 1 is a schematic, not to scale, cross-sectional view of a stripline cable 1 inserted in a slot 10 cut through a metal flange (not shown). Cable 1 includes copper signal lines 2 having a width of about 150 μm (6 mils) and a thickness of about 35 μm (1.4 mils), copper edge traces 3 having a width of about 375 μm (15 mils), and a dielectric layer 4, preferably Kapton™ polyimide having a total thickness of about 275 μm (11 mils). (The specific dimensions just recited and those that follow are illustrative.)

Encompassing dielectric layer 4 is a deposited copper ground layer 5 having a thickness of about 50 μm (2 mils). A thin (about 13 μm, 0.5 mil) layer 6 of solder , preferably a tin-lead solder, more preferably about 63/37 tin-lead, is deposited on ground layer 5.

On the inner edge surface 11 of slot 10 is deposited a very thin (about 2.5 μm, 0.1 mil) layer 12 of nickel; a thin (about 13 μm, 0.5 mil) layer 13 of solder, preferably 63/37 tin-lead solder, is then deposited on nickel layer 12.

The space within slot 10 between solder layer 13 and solder layer 6 on cable 1 is filled with solder bond 14, which has a relatively low fusing temperature and preferably comprises 50/50 indium-tin solder. Solder bond 14, which has a thickness of about 125 μm (5 mils), sealably connects stripline cable 1 within slot 10.

Stripline cables are available from various commercial sources, including Flex-Link Products, Inc., San Fernando Calif., and Parlex Corporation, Methuen Mass. Twenty-inch (50.8 cm) lengths of flat cables were purchased from three independent manufacturers. These cables were individually tested before incorporating them into feedthrough devices. Cables from two of these companies satisfied all mechanical and electrical requirements; those from the third vendor were insufficiently vacuum-tight.

A soldering station was designed and constructed to assemble prototype feedthrough devices. These prototypes included a full size flange plate that was used to demonstrate that, despite the low heat conductivity of stainless steel, such a plate can be heated evenly to the temperature required for soldering.

Figure 2:
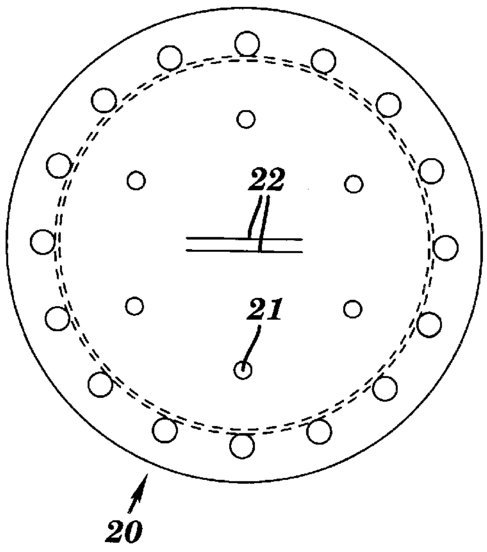
FIG. 2 is a plane view of a flange provided with two slots for the insertion of stripline cables.

Two single-flange feedthrough devices that contained two cables, each having 128 channels, were constructed. FIG. 2 depicts a circular flange plate 20 provided with tapped holes 21 and two EDM-cut slots 22.

Both of the two-cable, single-flange devices were thermally cycled from room to liquid $N_2$ temperature at least 3 times ( one was cycled 20 times), then tested using pressurized helium at 4 bar. No leaking around the solder-sealed cable-flange interface was detected at $10^{-9}$ bar cc/sec. One of these devices was also pressurized up to 20 bar, with no observed failure of the components.

The stripline cables included in the feedthrough device of the present invention should have the following characteristics:

- Flexibility for smooth bending and twisting
- Dimensional stability for a temperature range from −200° C. to +200° C.
- Vacuum-tightness to better than $10^{-9}$ bar cc/sec
- Minimal heat transfer along the cable (through the metallic component)
- Controlled characteristic impedance of about 50Ω per line
- Minimal DC resistance (less than about 1 Ω/ft)
- Minimal cross talk (less than 1%) between adjacent lines for very fast signals
- Tolerances within ±10%

Figure 3:
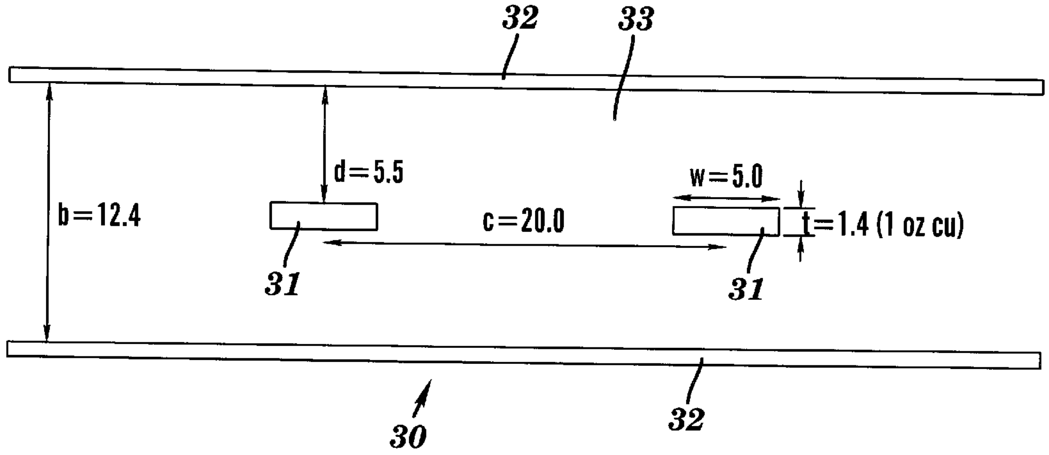
FIG. 3 is a schematic cross-section of a stripline cable.

Calculation and optimization of the characteristic cable impedance and the cross talk between adjacent lines was carried out using analytical formulae given in B. C. Wadell, Transmission Design Handbooks Reading Mass., Mar. 25, 1990. The transverse cross section of one embodiment of a stripline cable 30 is depicted in FIG. 3. Preferably, both the lines (signal channels) 31 and the ground 32 of cable 30 are formed from copper. The thickness of the copper should be large enough to minimize the line resistance but low enough to minimize etching effects. A thickness of 35 μm (1.4 mils, 1 oz. copper) was selected as the line thickness t.

Further specifying the signal conductor, lines 31 should be wide enough to minimize DC resistance while achieving the desired characteristic impedance, selected to be 50Ω per line. For a given impedance, the larger the width, the thicker should be the dielectric material. To keep the cable flexible and minimize cross talk, a dielectric 33 having a thickness d between lines 31 and ground 32 of 138 μm (5.5 mils), a dielectric 33 total thickness b of 310 μm (12.4 mils), and a channel width w of 125 μm (5 mils) were selected.

Once the thickness of the dielectric material is selected, the remaining important parameter for controlling cross talk between adjacent lines 31 is the spacing between them. To keep the cross talk in the specified range, the spacing c between lines 31 was chosen to be 250 μm (20 mils), center-to-center.

The stripline cables were manufactured by commercial vendors and tested in-house. A brief description of the feedthrough device fabricating procedure follows:

The metal flanges were machined to the appropriate dimensions in-house; the slots were cut and solder-plated by outside companies. After inspection of all components, the cables, pretested for vacuum tightness, were sealed into the flanges by soldering. The solder joints were leak-tested using a vacuum tester that was designed and constructed in-house.

The stripline cables containing Kapton™ polyimide dielectric material were manufactured using standard printed circuit technology. The cables were constructed of inert materials laminated so as to preclude trapped air molecules, thereby ensuring a leak-tight bond. The materials employed in one embodiment include:

- Kapton™ polyimide resin, selected for its flexibility and manufacturability;
- A modified polyimide adhesive having high viscosity at the bonding temperature
- 1 oz. copper for signal traces and ½ oz. copper for the ground To avoid out-gassing, the lamination is typically carried out in the following steps: heating in an oven to remove absorbed water; removing reaction condensation; and laminating in a constant temperature press at a temperature of about 250° C. and a pressure of 4 MPa for approximately 30 minutes.

Stainless steel (SS) has a relatively low coefficient of thermal conductivity compared, for example, to copper. Therefore, solder sealing stripline cables to SS flanges requires special care. A soldering station capable of providing sufficient heat for the process was constructed, and a technique for performing the heating process efficiently was developed.

Figure 4:
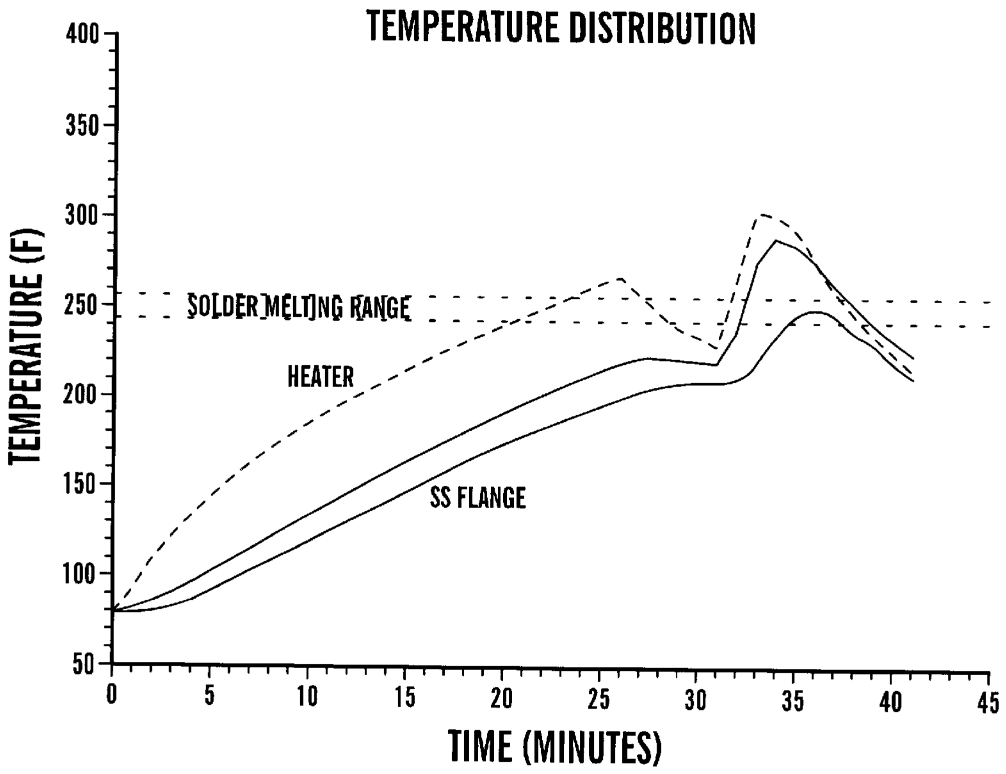
FIG. 4 is a graph of the temperature of a flange as a function of heating time.

To achieve even heating of the SS plate, all elements are slowly preheated to about 230° F., below the fusing temperature of 50/50 indium-tin solder. Then a faster heating rate is used to raise the temperature rapidly to about 275° F. As soon as the solder is completely melted and the cable-plate assembly attains thermal equilibrium, it is quickly cooled, using fans, to below the solder fusing temperature, and then allowed to cool further naturally. This results in a typical temperature profile as a function of heating time, as shown in FIG. 4.

Figure 5:
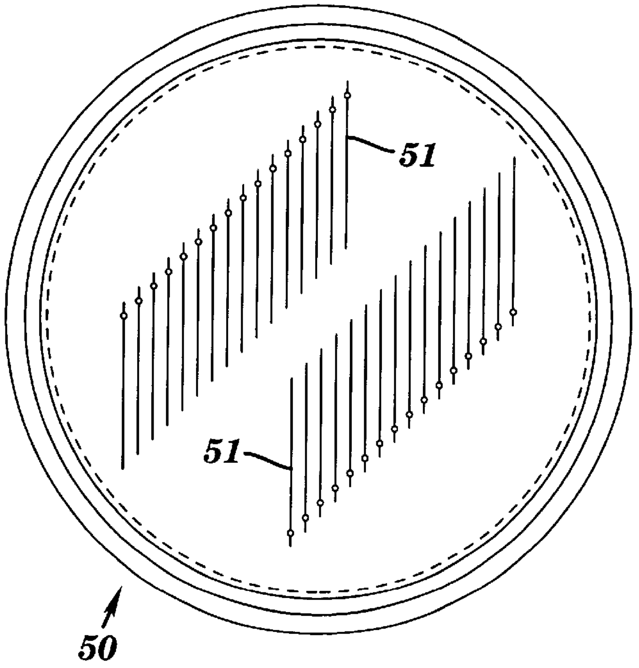
FIG. 5 depicts a flange containing 32 slots.

The described technique has been applied to sealing a multiplicity of cables in a single flange to yield a feedthrough device having many channels. FIG. 5 depicts plane and cross-sectional views of a circular flange 50 having 32 slots 51. Sealing a stripline cable (not shown), each containing 64 signal channels, into each slot 51 of flange 50 provides a feedthrough device having 2048 channels.

The continuous feedthrough components were tested individually before assembly. Upon receipt from the manufacturers, the stripline cables were individually tested, using an in-house constructed cable tester, before being assembled with a flange. For this testing, the cables were temporarily sealed into test plates using bees-wax; the cable tester allowed for the testing of all possible leak paths, including end-to-middle and end-to-end.

A soldering station constructed in-house, which is capable of providing sufficient heat to raise the temperature of stainless steel flanges to the soldering temperature, employs six 200 W electrical heaters mounted on each side of the flange plates. These heaters provide up to 4.8 kW of heat to enable quick soldering. The vacuum tightness of the completed feedthrough devices was checked using an in-house fabricated vacuum tester.

Figure 6:
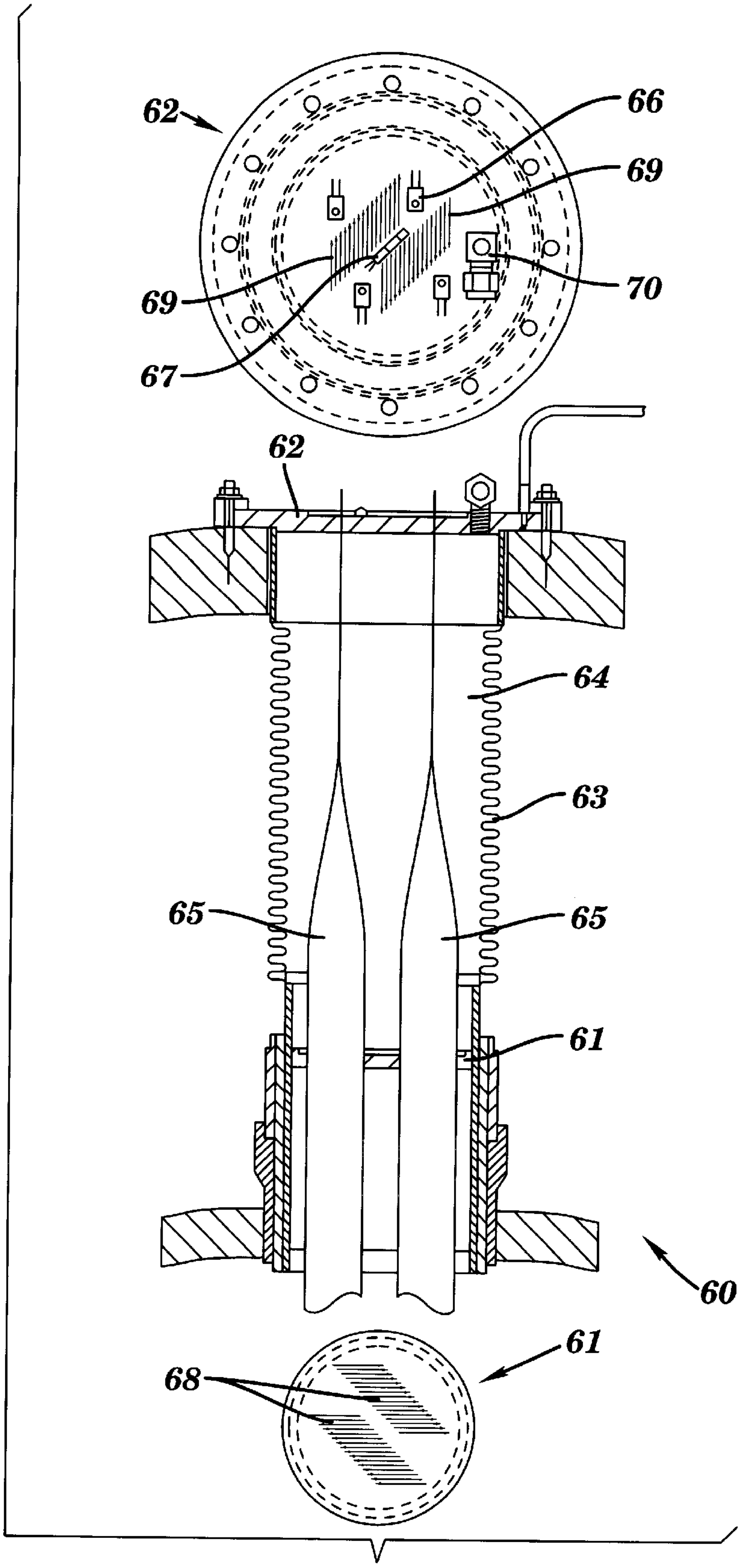
FIG. 6 includes a cross-section and end views of a cable feedthrough device comprising two flanges, a bellows, and 30 stripline cables.

FIG. 6 includes cross-sectional and plane views of a further embodiment of the present invention. Cable feedthrough device 60 comprises a first flange 61, a second flange 62, and a flexible bellows 63 sealably connected to flanges 61 and 62 to provide a substantially vacuum-tight enclosure 64 for 30 stripline cables 65. Feedthrough device 60 is well-suited for use with a cryostat (not shown) connected to first flange 61, which serves as a "cold flange." Second flange 62, which serves as a "warm flange," is optionally equipped with heaters 66 for maintaining the temperature of flange 62 above the dew point and a thermocouple 67 for monitoring the temperature. Both flanges 61 and 62 are suitably formed from stainless steel plate having a thickness of ⅜ inch (9.5 mm).

An arrangement of 30 slots 68, parallel to one another, is EDM cut through first flange 61. A similar pattern of 30 slots 69, parallel to one another but orthogonal to slots 68, is cut through second flange 62. Each of the stripline cables 65 is inserted in a slot 68 in first flange 61 and in a corresponding slot 69 in second flange 62. The 30 cables 65 are subsequently sealably soldered over a single heating cycle, as illustrated in FIG. 4, to both flanges 61 and 62. Because each slot 68 is orthogonal to its corresponding slot 69, each cable 65 must be twisted through an angle of 90 degrees within enclosure 64. This arrangement provides needed flexibility required during contraction and/or expansion of bellows 63 and enclosure 64 as the cryostat temperature varies over a wide range.

Bellows 63, which provides flexibility to cable feedthrough device 60, is preferably formed from thin stainless steel, a suitable thickness being 8 mils (200 μm). Bellows 63 is sealably connected, preferably by welding, to flanges 61 and 62. Vacuum is established and maintained within enclosure 64 via port 70 in second flange 62 to a vacuum pump (not shown).

The invention has been described in detail with particular reference to preferred embodiments thereof, but it will be understood that variations and modifications can be effected within the spirit and scope of the invention.

What is claimed is:

1. A process for forming a substantially vacuum-tight continuous cable feedthrough device comprising:

providing at least one flat stripline cable comprising a dielectric material encompassing a plurality of conductive signal channels and, disposed on each of upper and lower surfaces of said dielectric material, a conductive material comprising a ground;

forming at least one slot through a first structure, said at least one slot having a width and a thickness dimension sufficient to enable inserting of said at least one stripline cable in said at least one slot;

applying a nickel layer on inner edge surfaces of said at least one slot and a copper layer on a portion of edge surfaces of said at least one stripline cable to be situated within said at least one slot;

subsequent to said applying, inserting said at least one stripline cable in said at least one slot in said first structure; and sealing said at least one stripline cable within said at least one slot in said first structure, thereby forming a substantially vacuum-tight seal between said at least one stripline cable and said first structure.

2. The process of claim 1 further comprising:

prior to inserting said at least one stripline cable in said at least one slot, applying sealer comprising a layer of solder on the nickel layer on the inner edge surfaces of said at least one slot and on a portion of edge surfaces of said at least one stripline cable to be situated within said at least one slot.

3. The process of claim 2 wherein said solder comprises an approximately 63/37 tin-lead solder.

4. A process for forming a substantially vacuum-tight continuous cable feedthrough device comprising:

providing a plurality of flat stripline cables each comprising a dielectric material encompassing a plurality of conductive signal channels and, disposed on each of upper and lower surfaces of said dielectric material, a conductive material comprising a ground;

forming a plurality of slots through a first structure, each of said plurality of slots having a width and a thickness dimension sufficient to enable inserting of a corresponding stripline cable in said slot, each of said slots being disposed parallel to one another;

forming a plurality of slots corresponding to said plurality of stripline cables through a second structure, each of said plurality of slots having a width and a thickness dimension sufficient to enable inserting of a corresponding stripline cable in said slot, each of said plurality of slots in said second structure being disposed parallel to one another and orthogonal to said plurality of slots in said first structure;

inserting each of said plurality of stripline cables into a slot included in the corresponding plurality of slots in said first and second structures;

sealing said plurality of stripline cables within said corresponding plurality of slots in said first and second structures, thereby forming a substantially vacuum-tight seal between said plurality of stripline cables and said first and second structures; and sealably connecting said first structure with said second structure using a metallic bellows, thereby forming a substantially vacuum-tight, flexible housing for said plurality of stripline cables.

5. A method of making a substantially vacuum-tight continuous cable feedthrough device comprising:

providing a first structure having at least one slot penetrating through the first structure;

passing a conductor through the at least one slot, the conductor comprising a dielectric material encompassing a plurality of conductive signal channels and, disposed on at least one surface of the dielectric material, a conductive material comprising a ground; and sealing a portion of the conductor within the at least one slot in the first structure under conditions effective to form a substantially vacuum-tight seal between the conductor and the first structure, wherein the sealing comprises applying a first solder and a second solder.

6. A method of making a substantially vacuum-tight continuous cable feedthrough device comprising:

providing a first structure having at least one slot penetrating through the first structure, wherein the at least one slot has inner edge surfaces, a conductive material being disposed on the inner edge surfaces;

passing a conductor through the at least one slot, the conductor comprising a dielectric material encompassing a plurality of conductive signal channels and, disposed on at least one surface of the dielectric material, a conductive material comprising a ground; and sealing a portion of the conductor within the at least one slot in the first structure under conditions effective to form a substantially vacuum-tight seal between the conductor and the first structure.

7. A method of making a substantially vacuum-tight continuous cable feedthrough device comprising:

providing a first structure having a plurality of slots penetrating through the first structure;

providing a second structure displaced from the first structure and provided with a plurality of slots penetrating through the second structure;

passing a plurality of conductors through the corresponding plurality of slots in the first and second structures, the plurality of conductors comprising a dielectric material encompassing a plurality of conductive signal channels and, disposed on at least one surface of the dielectric material, a conductive material comprising a ground;

sealing a portion of the plurality of conductors within the corresponding plurality of slots in the first and second structures under conditions effective to form a substantially vacuum-tight seal between the plurality of conductors and the first and second structures; and providing a housing connecting the first structure with the second structure.

8. The method of claim 7 wherein the housing is expandable and flexible.

* * * * *

UNITED STATES PATENT AND TRADEMARK OFFICE
CERTIFICATE OF CORRECTION

PATENT NO. : 6,260,754 B1
DATED : July 17, 2001
INVENTOR(S) : Kamel Abdel Bazizi et al.

It is certified that error appears in the above-identified patent and that said Letters Patent is hereby corrected as shown below:

Column 1,
Line 4, insert the following:
-- This invention was developed with government funding under DOE Grant No. DE-FC02-91ER40685. The U.S. Government may have certain rights. --.

Signed and Sealed this

Seventh Day of February, 2006

JON W. DUDAS
*Director of the United States Patent and Trademark Office*